April 25, 1944.  W. O. BENNING  2,347,391
APPARATUS FOR FEEDING TILES TO SPRAYING MACHINES
Filed May 30, 1942  8 Sheets-Sheet 1

INVENTOR.
Wilbert Orville Benning
BY
Attorney.

April 25, 1944. W. O. BENNING 2,347,391
APPARATUS FOR FEEDING TILES TO SPRAYING MACHINES
Filed May 30, 1942 8 Sheets-Sheet 2

INVENTOR.
Wilbert Orville Benning
by: [signature]
ATTORNEY.

April 25, 1944. W. O. BENNING 2,347,391
APPARATUS FOR FEEDING TILES TO SPRAYING MACHINES
Filed May 30, 1942 8 Sheets-Sheet 5

INVENTOR.
Wilbert Orville Benning,
BY
Attorney.

INVENTOR.
Wilbert Orville Benning
BY
Attorney

Patented Apr. 25, 1944

2,347,391

UNITED STATES PATENT OFFICE 2,347,391

APPARATUS FOR FEEDING TILES TO SPRAYING MACHINES

Wilbert Orville Benning, Los Angeles, Calif., assignor to Pacific Clay Products Company, a corporation of California Application May 30, 1942, Serial No. 445,203

7 Claims. (Cl. 198—26)

My invention relates to improvements in tile spraying apparatus and more particularly to means for feeding the tiles to be sprayed into a spraying chamber in which the surfaces of the tiles are coated with suitable glazing material while the tiles advance in a substantially continuous procession and are delivered ready to be loaded in saggers in readiness for firing.

The primary object of this invention is to provide means in combination with spraying apparatus for automatically feeding and spacing tiles in a continuous series with faces upward permitting perfect application of glazing material. It is a further object of my invention to save time and labor and reduce to a minimum the breaking of tiles and the scratching and marring of their faces, during the operation of feeding into and through the spraying apparatus.

To these ends my invention comprises the features of construction and combination of parts hereinafter described and claimed.

In the accompanying drawings forming part of this specification.

Figure 1:
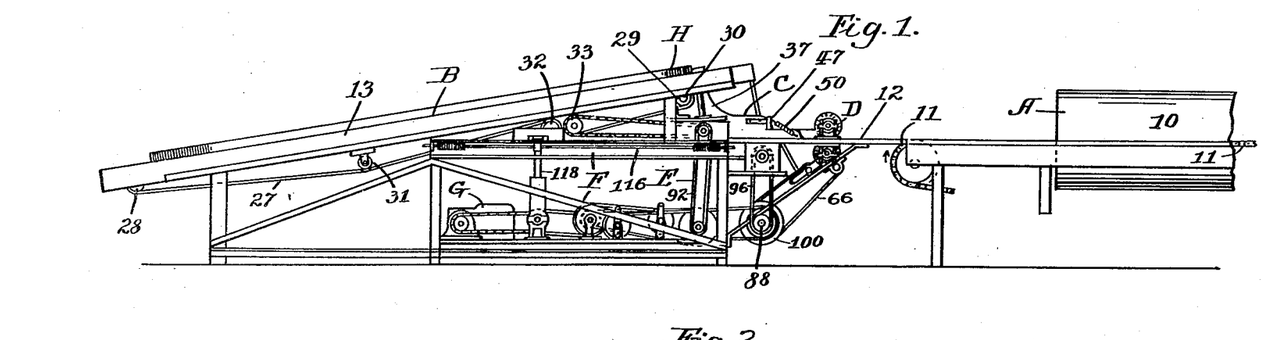
Fig. 1 is a side elevation, partly schematic of the improved feeding and spraying apparatus.

In the drawings, Fig. 1 represents the entire assemblage of the main elements of the invention, A representing a portion of a spraying apparatus of usual construction into which it is desired to feed tiles in series to be sprayed and having a chamber 10 resembling a horizontal drum through which the tiles in horizontal position and in longitudinally spaced relation are conducted by the continuously operating endless belt 11 and in which the usual forced feed sprayers (not shown) are employed for spreading an even coat of suitable glaze material. After receiving the coat of glaze in the spraying chamber the tiles emerge and are removed from the conveyor belt 11 by hand and loaded into saggers in readiness for firing. The spacing of the tiles on the conveyor in the spraying apparatus prevents the tiles from contacting and sticking together which have produced imperfect surfaces.

B represents a loading conveyor in which the tiles are first placed by hand to accumulate in the form of stacks while the tiles are individually supported on edge and by which they are permitted to discharge one at a time into the magazine of the feeding apparatus C. The feeding apparatus converts each advancing tile from substantially upright position while facing forwardly into horizontal position and advances the tiles at suitable speed in a longitudinal and horizontal row and in closely associated position upon a delivery table 12 to the spraying apparatus. D represents a power driven brush unit which removes dust and objectionable particles from the surfaces of tiles as they advance on the table. E represents suitable power driving mechanism for operating the various elements of the apparatus at slightly less surface speed than the surface speed of the conveying belt 11 of the spraying apparatus, whereby the tiles are caused to advance while slightly separated longitudinally on the conveyor by which they are conducted slowly through the spraying apparatus so as to allow sufficient time for effective spraying. F represents a suitable stationary supporting frame and G a power driving unit.

Figure 2:
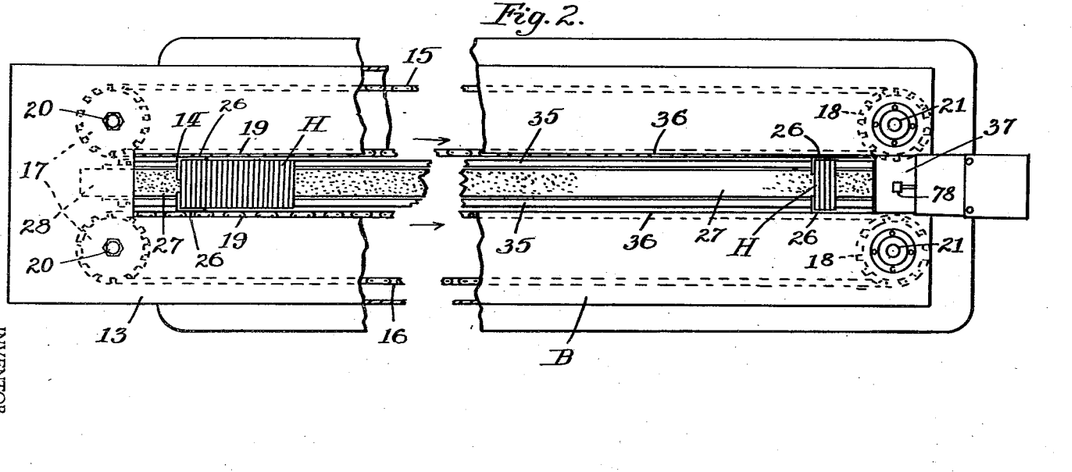
Fig. 2 is a plan of a detail partly broken away, showing the loading conveyor by which the tiles are fed in regular order into the apparatus which delivers the tiles to the spraying chamber.
Figure 9:
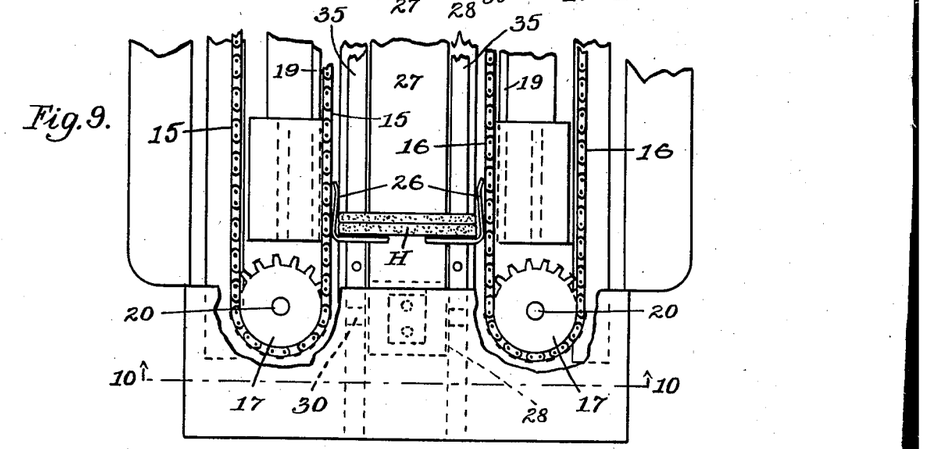
Fig. 9 is a plan of the lower receiving end of the loading conveyor.
Figure 10:
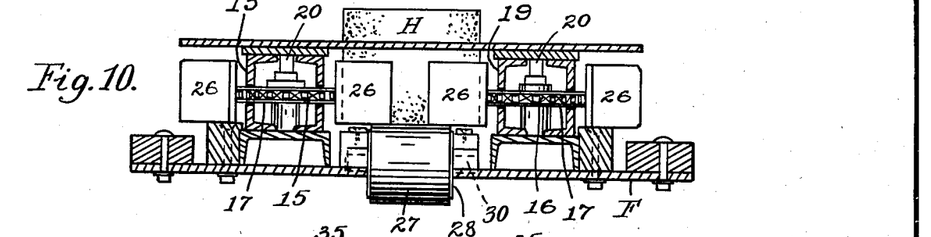
Fig. 10 is a section taken on line 10—10 of Fig. 9.

The loading conveyor comprises a body frame 13 resembling an oblong box like structure supported upon the main frame in upwardly and forwardly slanting position and having a longitudinal centrally disposed channel 14 in its upper side and in which the rectagular tiles such as H are stacked by the operator with the individual tiles resting on edge facing forwardly. Extending from the lower to the upper end of the body frame are two opposite laterally disposed endless chain belts 15 and 16, which travel over the opposite pair of idle sprockets 17 and upper pairs of power driven sprockets 18, with their inner side laps spaced apart and traveling upwardly along the opposite side walls 19 of the channel 14. The lower pair of sprockets have their upwardly extending stub shafts 20 journaled in the body frame as shown in Figs. 9 and 10, while the upper pair of sprockets have their power driven shafts 21 extended downwardly below and journaled in the body frame and in the suitable supporting structure 22 (see Fig. 11) which is interposed between the body frame and the main stationary frame F as indicated by the detail shown in Fig. 11. The lower ends of the power driven conveyor belt shafts 21 have suitable bevel gear connections 23 with a counter drive shaft 24, which latter is journaled in the supporting structure 22 and driven through the drive sprocket 93 by the main driving mechanism E, to be hereinafter described. Pairs of opposite flights 26, disposed at suitable intervals are mounted upon the conveyor belts 15 and 16, said flights projecting horizontally into the channel 14 from its side walls as shown particularly in Fig. 2 and being adapted to engage and move a series of the stacks of tiles while the individual tiles of each group are supported with their lower edges resting on the gate belt 27, in the channel to be discharged automatically at the upper end of the loading conveyor.

Figure 3:
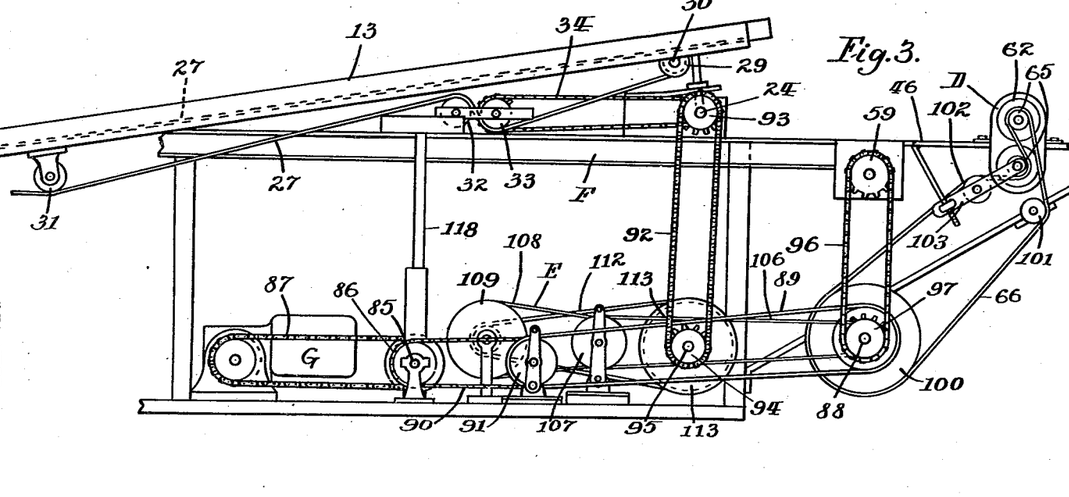
Fig. 3 is a side elevation showing the driving mechanism for operating the feeding apparatus provided by my invention.
Figure 11:
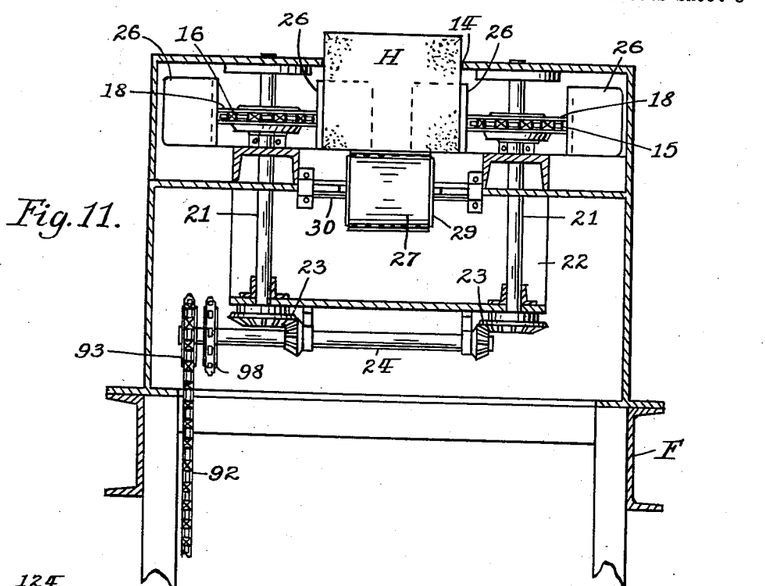
Fig. 11 is a section of the upper end of the loading conveyor taken approximately on line 11—11 of Fig. 5.
Figures 12, 13:
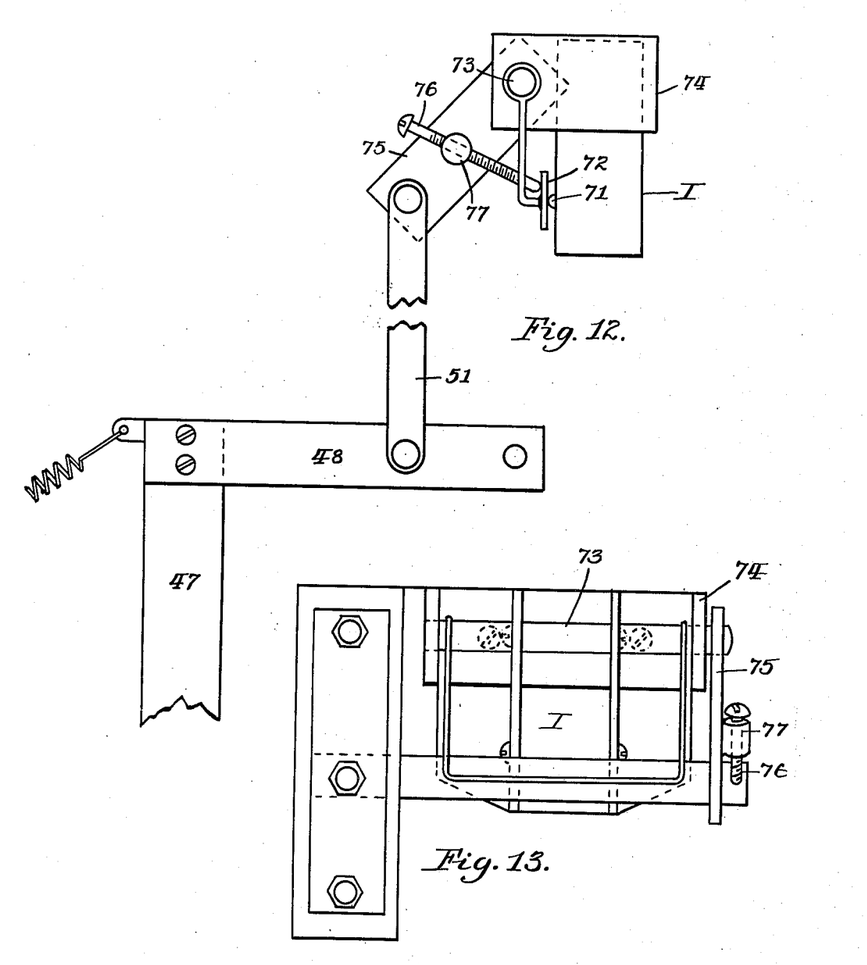
Fig. 12 is a side elevation of a detail showing part of the double acting switch for checking the operation of the apparatus in the event the tiles jam either when discharged from substantially upright position at the upper end of the loading conveyor or when discharged from the magazine after assuming horizontal position below the loading conveyor.
Fig. 13 is a front elevation of part of the structure shown in Fig. 12.

The flat conveyor belt 27 assists in performing the function of a gate in the channel of the body frame. The gate belt travels around the idle pulleys 28 and 29, which are freely journaled by the stub shafts 30 in the lower and upper ends of the body frame, as shown in Figs. 9 and 11. The lower lap of the gate belt 27 travels over the idle pulley 31 and pulleys 32 and 33 (the latter a driver) on the stationary frame F, as shown in Fig. 3. The driving pulley 33 is driven through chain belt 34 by the main driving mechanism E to be hereinafter described so that the advancing speed of the gate belt 27 over the floor in the bottom of the tile holding channel corresponds with the advancing speed of the side elevating belts 15 and 16. In use the tiles are stacked standing on edge and facing forwardly in the channel upon the gate belt and upon the pairs of flights as they advance upwardly. Suitable guide strips 35 are secured on the floor of the channel alongside of the upper lap of the gate belt, by which the upper lap of the belt is directed forwardly. The side edges of the channel act as guides for assisting in directing the chains as they advance.

Figures 5, 6:
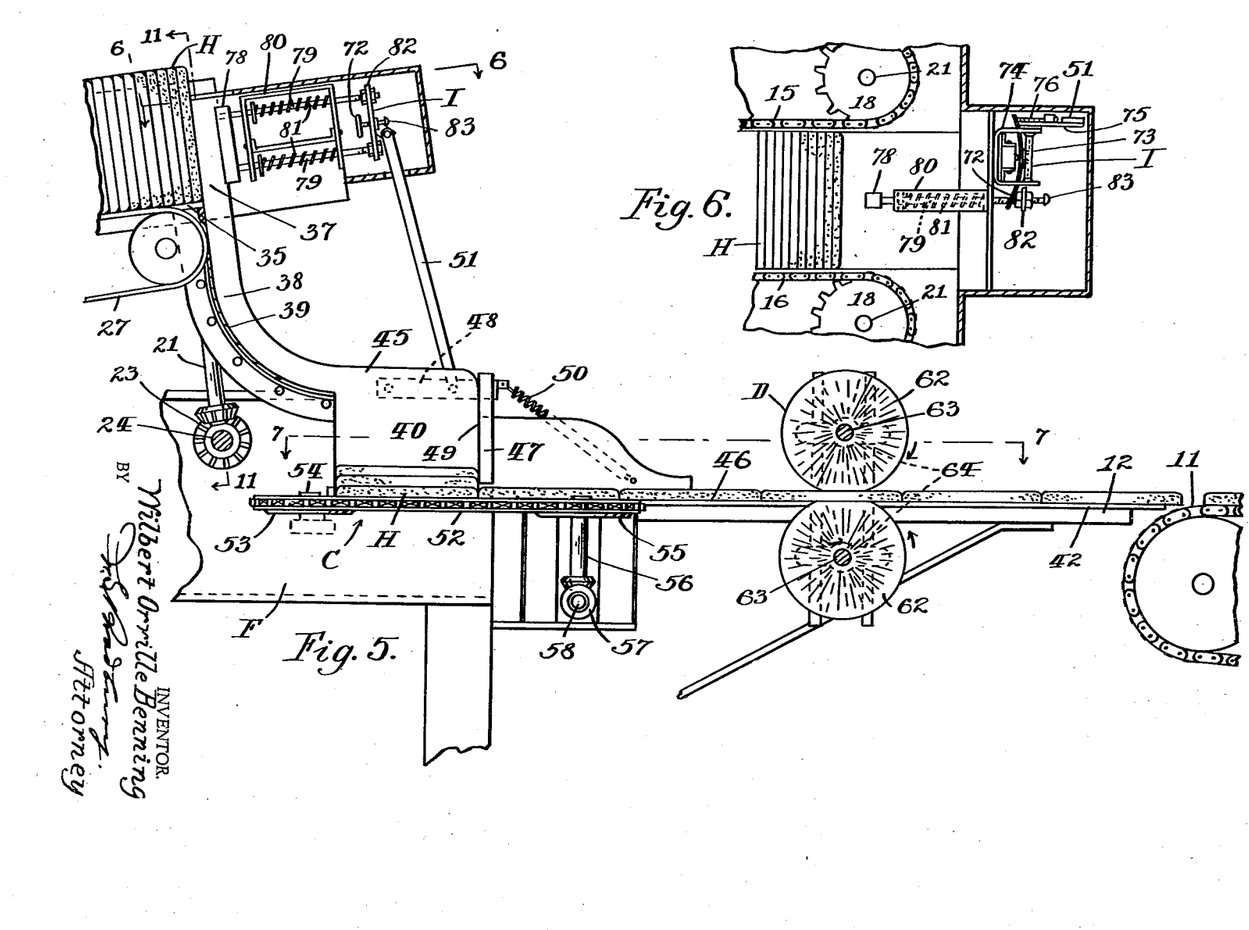
Fig. 5 is a central longitudinal section taken approximately on line 5—5 of Fig. 7, on an enlarged scale, of a detail showing the general assemblage of parts between the upper end of the loading conveyor and the receiving end of the sprayer.
Fig. 6 is a section of a detail taken approximately on the line 6—6 of Fig. 5.

The upper end of the channel 14 in the body frame terminates in a gateway 37 in its floor through which the tiles are successively discharged downwardly by the gate belt in cooperation with the rails 35 and chute 38 as they advance upwardly along the channel. The delivery chute 38 resembles a downwardly and forwardly curved channel connected with the floor of the conveyor channel in the loading conveyor body frame and receives the tiles as discharged while in substantially upright position and diverts them into substantially horizontal position, whereupon they are guided into a magazine 40, (see Fig. 5), of the feeding apparatus C. The gateway 37 it will be noted adjoins the upper ends of the gate and side conveyor belts. The floor of the chute 38 is provided with a thin curved surface sheet 39 of fiber board or other suitable material which produces an anti-friction slide.

The loading conveyor above described, it will be noted, enables the operator to load tiles continuously into the feeding apparatus without interrupting the operation of the device.

The feeding apparatus employs a pair of longitudinally disposed side walls 45 which guide the tiles down the chute 38, assist in forming the magazine 40 and guide the tiles forwardly along the floor of guideway 46 as they are discharged from the magazine. The object of the magazine is to receive a sufficient supply of the tiles with their finished faces directed upwardly from the loading conveyor so that they may be discharged in closely assembled longitudinal series and propelled along the guideway toward the spraying apparatus. A pair of laterally spaced slide rails 42, forming the floor of the guideway and of the magazine extend longitudinally from the magazine toward the sprayer chamber to deliver the tiles to the sprayer conveyor belt 11. The speed at which the tiles are propelled forwardly from the magazine is slower than the surface speed of the conveyor belt 11 so that the tiles lag and are received on belt 11 in slightly spaced condition longitudinally and travel while remaining spaced apart through the spraying apparatus, to prevent imperfections when sprayed. The forward side of the magazine has a movable vertical block or check 47 which resembles a front wall hinged upon the sides 45 of the magazine by the rocker arms 48 to swing upwardly. In downward position the block 47 rests against the forward end portions 49 of the side walls 45 with the lower edge of the block only a sufficient distance above the floor of the guideway 46 to permit the lowermost tile held in the magazine being discharged forwardly from the magazine. The remaining tiles stacked in the magazine are retained by the block from advancing.

The block 47 is releasably held in lowermost position by springs 50. Should the tiles accumulate in a faulty position in the magazine so as to interfere with their free passage forwardly any wedging effect will tend to lift the block, thereby immediately stopping the action of the machine until such obstruction has been removed.

Figure 8:
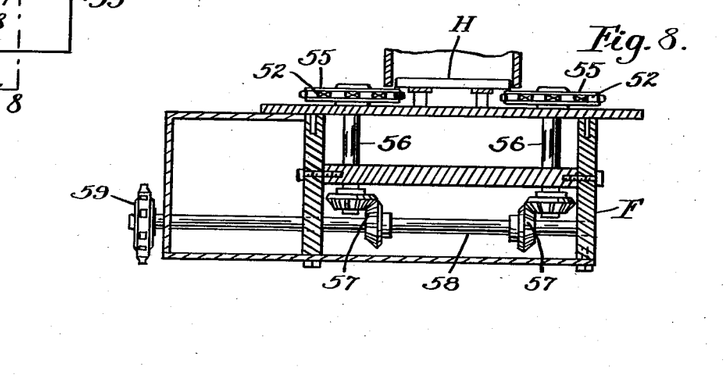
Fig. 8 is a section of a detail taken approximately on line 8—8 of Fig. 7.

The discharge of the tiles H from the magazine is by means of a pair of longitudinal endless chain belts 52, operating in a horizontal plane along the floor of the guideway, said chain belts being mounted upon a pair of rearward idle sprockets 53 which are journaled by vertical stub shafts 54 in the frame of the apparatus, and the pair of forward drive sprockets 55 which are mounted upon shafts 56, said shafts in turn being driven by the pairs of intermeshing gears 57, counter shaft 58 and drive sprocket 59 (see Fig. 8). The pair of inner side laps of the feed belts 52 travel forwardly in parallel evenly spaced relation at even speed below the outer side edges of the tiles in the magazine and along passageway 46. Flights resembling upwardly projecting pins 60, from the upper edges of the belts and arranged in opposite pairs at suitable spaced intervals longitudinally are adapted to engage the rearward edge of each lowermost tile in the magazine and move the tiles so engaged successively below the lower edge of the block 47, thus pushing a series of tiles along passageway 46 and delivering them to the spraying apparatus.

Figure 7:
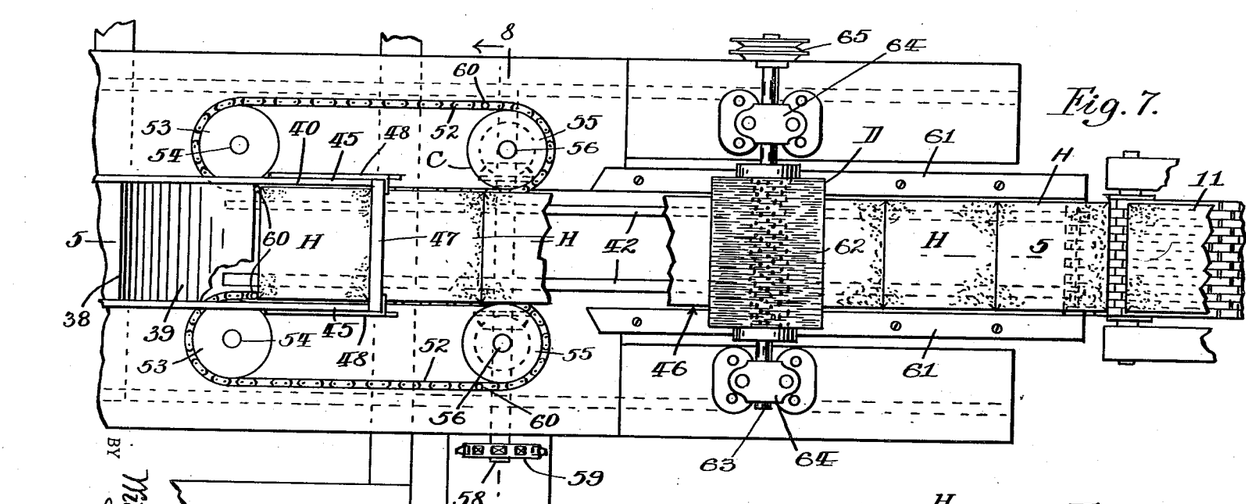
Fig. 7 is a plan of that portion of the structure below the line 7—7 of Fig. 5.

Arranged adjacent to the passageway 46 between the magazine and receiving belt 11 of the sprayer chamber is a pair of rotary brushes 62 which are adapted to revolve against the upper and lower surfaces of the tiles as the latter advance and remove any dust or objectionable particles from the tiles so that their surfaces are thoroughly cleaned before entering the spraying apparatus. These brushes are mounted upon shafts 63, said shafts being journaled in bearings 64 and revolved by drive pulleys 65 and belt 66 (see Figs. 3 and 7), the latter being driven by the driving mechanism G.

Figure 20:
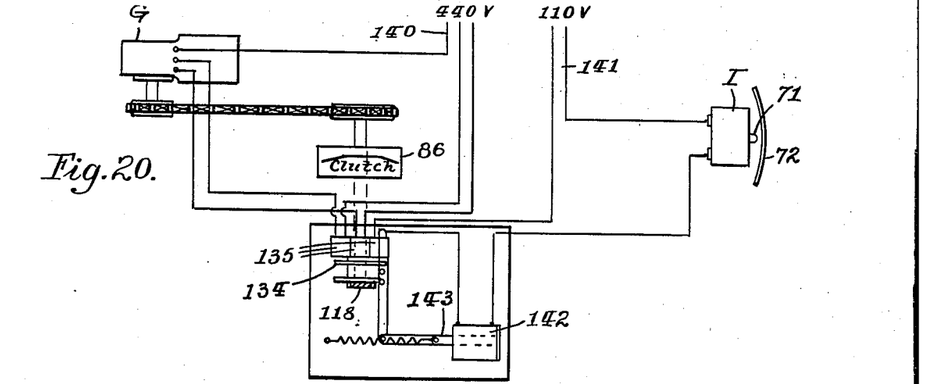
Fig. 20 is a diagram of the electrical operating circuit.

Should the tiles jam at the upper discharge end of the loading conveyor, or should they jam in the magazine, the double actuated switch I in the head end of the loading conveyor is operated automatically to open an electric circuit 141 (see Figs. 5 and 20) and interrupt the source of driving power supplied to the electric driving motor G. This switch is suitably mounted in the upper end of the enclosing frame of the loading conveyor and consists principally of a depressible switch actuating element 71 and a releasable double acting horizontal spring pressed closing contact arm 72. The contact arm is freely hung from a horizontal stationary supporting shaft 73 which is mounted in a supporting yoke 74 and a portion of the framework (see Figs. 5, 6, 12 and 13). Normally the opposite ends of the switch actuating arm 72 are held inwardly to maintain the switch actuator 71 closed and so that when either holding means is released the actuator 71 is released to open the circuit.

The holding means referred to above on one end of the switch actuating arm 72 consists of a link 75 journaled by one end on the shaft 73 and pivotally connected by its outer end to the upper end of the block operating connecting rod 51. An adjusting pin 76 (see Figs. 6 and 12) is threaded through the stud 77 on the side of the link 75 and bears against one end of the operating arm 72 so as to normally hold the switch actuator 71 closed. When the block 47 swings upwardly the arm 72 is released and the switch opens. The other holding means for the opposite end of the actuating arm 72 is adapted to be operated by an obstruction block 78 placed in the upper end of the frame of the loading conveyor in a position to be depressed by the tiles H in the event they jam as they discharge down the chute 38. The switch block 78 is mounted upon a pair of supporting shafts 79 which are slidably supported in a yoke frame 80 within the conveyor frame and are held under the tension of the springs 81 so that the block can be depressed. The inner ends of the shafts 79 (see Fig. 5) carry a cross bar 82 through which an adjustable pin 83 is threaded and so arranged as to normally bear against the end of the switch closing contact arm and hold the latter closed, or release the switch actuating arm 72 and cause the switch to open when the block 78 is depressed by the tiles. Thus normally the springs 50 hold the block 47 in lowermost position to permit a single tile at a time discharging from the magazine and the switch actuating arm 72 closed and the springs 81 hold the block 78 in outermost position when the tiles are free to discharge into the magazine from the loading conveyor and the switch actuating arm 72 also closed. Thus when either the block 47 or check 78 is actuated the switch operating arm is released into circuit opening position to automatically stop the operation of the apparatus. It is desirable to operate the loading conveyor and feeding mechanism at correlated speed, that is so that as each tile is discharged from the magazine 40, a fresh tile is released by the loading conveyor and deposited by chute 38 in the magazine. The double actuated safety stop described prevents blocking of the apparatus due to slight variation in thickness or unevenness of the tiles. It is also desirable to feed the tiles at properly regulated speed so that the feed belt 11 of the spraying apparatus will receive the tiles in isolated position apart.

Figure 4:
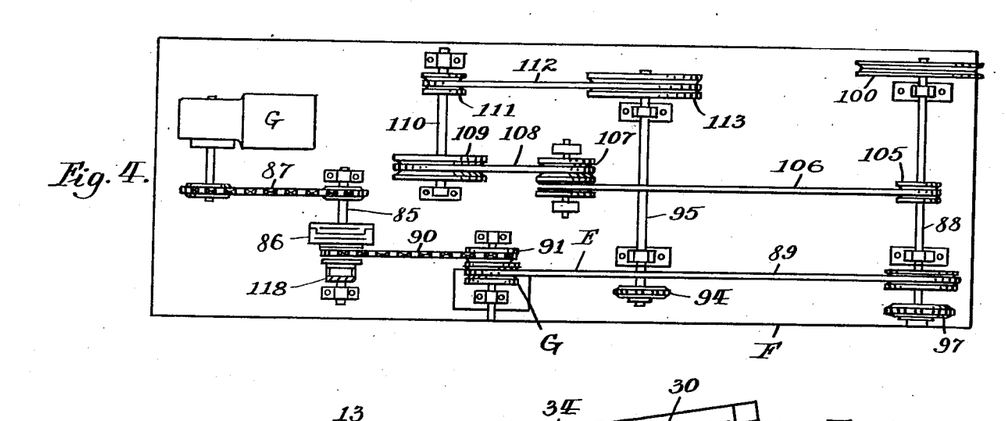
Fig. 4 is a plan of the driving mechanism shown in Fig. 3.

The driving mechanism for accomplishing the above results is shown diagrammatically, in part, in Figs. 3 and 4 and consists as follows: Starting with the prime mover such as motor G, a main shaft 85 containing the automatically shiftable clutch 86 is driven by chain belt 87. The portion of the shaft driven by the clutch transmits driving motion to the counter shaft 88 by the intermediate belts 89 and 90 and the variable speed pair of counter pulleys 91. The loading conveyor chain belts 15 and 16 are driven with the inner corresponding sides forwardly to advance the tiles by the bevel gears 23, shaft 24, chain belt 92, and sprockets 93 and 94, respectively on shaft 24 and counter shaft 95. The horizontal feed belts 52 are driven with their inner laps forwardly to discharge the tiles and advance them at suitable speed by means of the bevel gear driving shaft 58 which is driven by the sprocket 59, chain belt 96 and sprocket 97 on the driven counter shaft 88. The loading conveyor gate belt 27 is driven from the pulleys 32 and 33, through the gear shaft 24 at suitable speed by sprocket 98 (see Figs. 3 and 11) and chain belt 34 traveling over a sprocket portion of pulley 33. The brushes 62 are revolved together at suitable speed against the faces of the tiles by means of the belt 66 which in turn is driven by the pulley 100 on the counter shaft 88. The belt 66 is trained over idle pulleys 101 and 102, the latter being mounted on a suitable belt tightener 103. Shaft 95 receives its initial drive from the counter shaft 88 through suitable speed reducing means such as pulley 105, on shaft 88, belt 106, speed change pulleys 107, belt 108, pulley 109, stub shaft 110, pulley 111, belt 112 and pulley 113 on shaft 95.

Figures 14, 15:
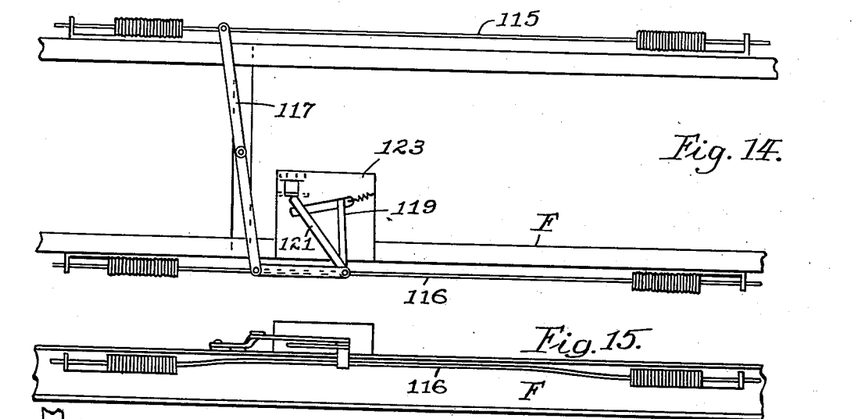
Fig. 14 is a schematic plan of a detail showing the manually operable clutch control mechanism.
Fig. 15 is a side elevation of the mechanism shown in Fig. 14.
Figure 16:
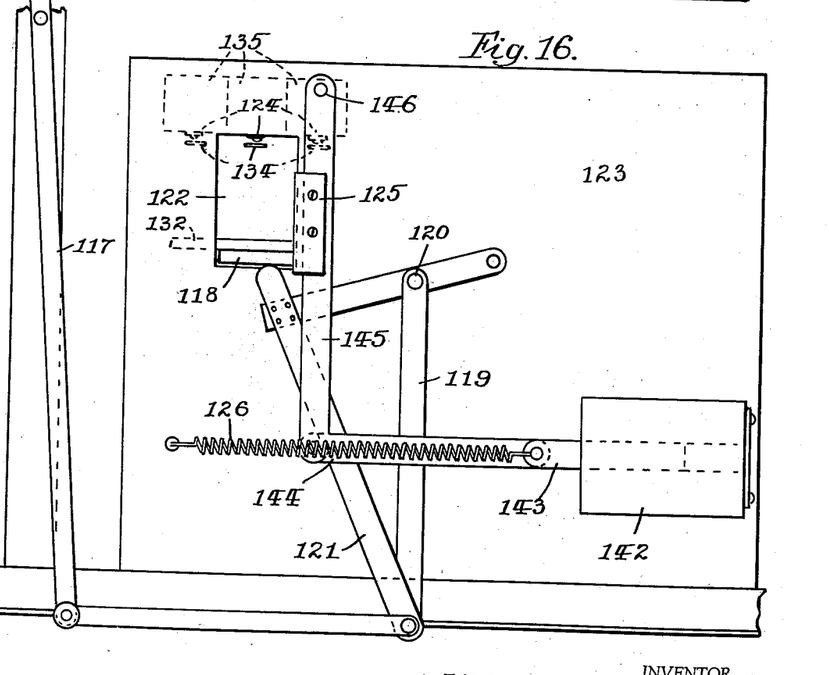
Fig. 16 is a plan of a detail showing the safety switch mechanism which is operated by the control mechanism.
Figure 17:
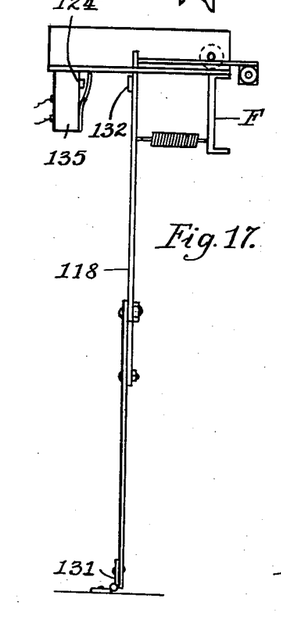
Fig. 17 is a side elevation of part of the manually controlled clutch and switch actuating mechanism employed for controlling the operation of the drive mechanism.
Figures 18, 19:
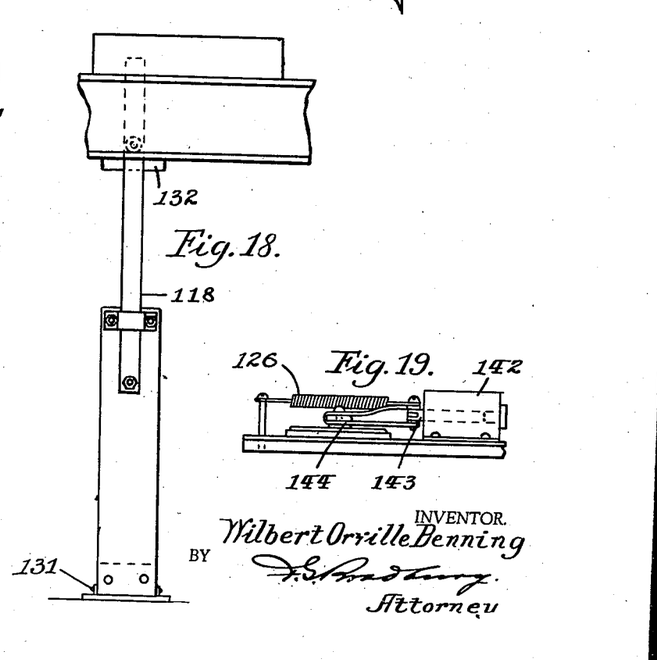
Fig. 18 is a front elevation of part of the structure shown in Fig. 17.
Fig. 19 is a front elevation of a detail showing the solenoid employed for operating the switch controlling mechanism.

The controlling mechanism is operated either by hand or automatically through the safety switch I which in turn is controlled by the safety checks 78 and 47 which are interposed in the train of advancing tiles at the point of discharge of tiles from the loading conveyor and at the point of discharge of tiles from the feeding magazine. First, the clutch 86 is operated to start or stop the operation of the apparatus through the reciprocable hand operated shift rods 115 and 116 (see Figs. 14 and 15) which are slidably mounted in the main frame convenient for the operator and attached to the pivoted link 117 for operation from either side of the machine. The shift rod 116 is coupled with the clutch engaging shift rod or lever 118 (see Figs. 1 and 3) through the bell crank lever 119 fulcrumed at 120 on base plate 123. The crank arm bears the operating arm 121 which actuates said clutch shift rod 118. The clutch shift rod swings inwardly through the passage 122 in the base plate 123 which supports the control mechanism in the main frame. In the forward position of the clutch shift rod 118 the latter is held in engagement against the circuit closing depressible switch plungers 124, by the releasable retaining catch 125, which is later automatically moved into engaging position by the tension of the helical spring 126. The shift rod 118 can be released from engagement by catch 125 to stop the driving mechanism against the tension of spring 126 by shifting either one of the rods 115 and 116 by hand.

The clutch engaging shift rod 118 is hinged at 131 near its lower end on the main frame and carries on its upper end a transverse arm 132 which in the forward position of rod 118 depresses the switch actuating plungers 124 through the interposed leaf springs 134 of usual construction. Said plungers are associated with suitable circuit controlling switches 135 which are included in the operating circuit. Thus through operation by hand the apparatus is caused to function to either start or stop when desired.

The power driving unit G, as shown is an electric motor which is connected into the power circuit 140, which has two of the switches 135 included therein. The remaining switch provides a safety means for preventing any damage either to the tiles or to the machine proper. The circuits are illustrated diagrammatically in Fig. 20 and are so arranged that when the tiles jam for any cause against the obstruction block 70 or check 47, the switch I is opened automatically, thus energizing a solenoid 142. This solenoid 142 when energized, retracts the solenoid plunger 143, which is pivoted by the link 144 to arm 145, the latter being also pivoted at 146 on the base 123. The arm 145 carries the retaining catch 125. The retractile spring 126 tends to keep the retaining catch engaged when the clutch shift 118 is in forward clutch engaging position. When energized the solenoid retracts and releases the retaining catch 125 against the tension of spring 126, allowing the shift 118 to also release the clutch and simultaneously break the electrical circuits 140 and 141 and stop the operation of the apparatus until the obstruction has been removed. The apparatus is then in readiness for restarting by operating the shift rods 115 and 116 by hand.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

I claim:

1. In an apparatus for feeding tiles in longitudinal spaced relation onto the feed bed of spraying apparatus, an upwardly sloping conveyor having a carrier upon which the tiles are adapted to be stacked on edge extending upwardly and permitted to discharge successively from its upper delivery end, a chute below the upper delivery end of said carrier by which the tiles as received are diverted from upward into horizontal position, a magazine below the delivery end of said chute in which the tiles assemble in a vertical stack, and projector means for feeding the tiles successively from the bottom of the stack in said magazine and delivering them in longitudinal line to the feed bed of said spraying apparatus, the relative surface speed of said projector means being less than the surface speed of the feed bed of the spraying apparatus, whereby the tiles are spaced longitudinally apart when delivered onto the feed bed.

2. In an apparatus as defined in claim 1, the speed at which the conveyor advances the tiles and the speed at which the tiles are projected from the stack in the magazine being correlated so as to reduce any tendency toward accumulation of tiles in the magazine.

3. In an apparatus as defined in claim 1, the diverting means between the upper delivery end of the conveyor and magazine resembling a curved chute by which the tiles are transmitted by gravity from a position with their flat sides standing upwardly gradually into a position with their flat faces substantially horizontal.

4. In an apparatus for feeding tiles in spaced relation onto the feed bed of a machine element, an upwardly sloping conveyor having a carrier element discharging at its upper end and upon which the tiles are adapted to be stacked on edge with their flat sides extending upwardly, a chute below the discharging end of the conveyor by which the tiles as received from the upper discharging end of the conveyor are converted from upward into substantially horizontal position by gravity, a magazine below the delivery end of said chute into which the tiles assemble in a vertical stack, means for projecting the tiles successively from the bottom of the stack in said magazine, a delivery carrier for advancing the tiles as received from the projecting means in a longitudinal line to the feed bed of said machine element, the relative surface speed of the delivery carrier being less than the surface speed of the feed bed of said machine element, whereby the tiles are spaced apart as they are delivered upon said feed bed, and means for driving the conveyor, the projector means and said delivery carrier.

5. In an apparatus for feeding tiles in spaced relation onto the feed bed of a machine element, an upwardly sloping feed carrier discharging at its upper end and upon which the tiles are adapted to be stacked on edge with their flat faces extending upwardly, a chute below the discharging end of said feed carrier by which the tiles as received from said carrier element are converted from upward into substantially horizontal position, a magazine below the delivery end of said chute into which the tiles assemble in a vertical stack, means for delivering the tiles from said magazine onto the feed bed of said machine element, a drive for actuating the carrier at constant speed, and controlling means governing the operation of said drive having switch actuating means operable by an excessive accumulation of tiles at the junction of the delivery end of said carrier and chute for automatically checking the operation of said drive and interrupting the operation of said carrier.

6. In an apparatus for feeding tiles onto the feed bed of a machine element, a feed carrier discharging at one end and upon which the tiles are adapted to be stacked on edge with their flat sides extending upwardly, a chute below the discharge end of said carrier down which the tiles are permitted to slide successively from said carrier, a magazine in which the tiles are vertically stacked in horizontal position by the chute, an ejector for feeding the tiles successively from the bottom of the stack in said magazine forwardly in line to deliver the tiles onto the feed bed of said machine element, a stop against which the tiles are permitted to accumulate in said magazine, said stop being movable upwardly under force produced by an excessive accumulation of tiles, a drive for actuating the feed carrier, and controlling means governing the operation of said drive having switch actuating means operable by said stop when the latter is moved upwardly.

7. In an apparatus for feeding tiles onto the feed bed of a machine element, a feed carrier discharging at one end and upon which the tiles are adapted to be stacked on edge with their flat faces extending upwardly, a chute down which the tiles are permitted to slide successively from the delivery end of said carrier and by which they are discharged in horizontal position, a magazine at the lower end of the chute in which the tiles are stacked, a stop against which the tiles are permitted to bear forwardly as they accumulate in the magazine, said stop being movable under force exerted forwardly by excessive accumulation of tiles, an ejector for feeding the tiles successively from the bottom of the stack in the magazine forwardly in line to deliver them successively onto the feed bed of said machine element, a drive for operating the feed carrier and the ejector, a switch for operating the drive, a second stop against which the tiles are permitted to bear forwardly as they accumulate excessively at the discharge end of the feed carrier, a switch controlling the operation of said drive, and connections between said switch and stops to interrupt the drive when the tiles accumulate excessively either at the discharge end of the feed carrier or in the magazine.

WILBERT ORVILLE BENNING.